United States Patent
Jiang

(10) Patent No.: US 6,788,944 B2
(45) Date of Patent: Sep. 7, 2004

(54) LENGTH INDICATOR FOR A PROTOCOL DATA UNIT IN A WIRELESS COMMUNICATIONS PROTOCOL

(75) Inventor: Sam Shiaw-Shiang Jiang, Hsin-Chu (TW)

(73) Assignee: ASUSTeK Computer Inc., Taipei (TW)

( * ) Notice: Subject to any disclaimer, the term of this patent is extended or adjusted under 35 U.S.C. 154(b) by 564 days.

(21) Appl. No.: 09/822,226

(22) Filed: Apr. 2, 2001

(65) Prior Publication Data

US 2002/0174276 A1 Nov. 21, 2002

(51) Int. Cl.[7] ................................................. H04Q 7/00
(52) U.S. Cl. ..................................... 455/450; 370/329
(58) Field of Search ................................. 370/329, 348, 370/349, 442, 448; 455/63.2, 410, 436, 450; 710/105

(56) References Cited

U.S. PATENT DOCUMENTS 5,742,592  * 4/1998  Scholefield et al. ........ 370/329
6,301,479  * 10/2001  Roobol et al. .............. 455/436

* cited by examiner

Primary Examiner—Khanh Dang
(74) Attorney, Agent, or Firm—Winston Hsu

(57) ABSTRACT

A data structure for a layer 2 protocol data unit in a wireless communications protocol has a sequence number region that holds a sequence number for indicating a sequential ordering of a first PDU in a stream of PDUs. A length indicator array follows the sequence number field, and has at least a final length indicator. The final length indicator is the last length indicator in the length indicator array and is n bits in length. An SDU array follows the length indicator array. The SDU array has at least a final SDU data block. The final SDU data block is the last SDU in the SDU array. The final length indicator indicates a position of the end of the final SDU block within the first PDU. Finally, a padding area is after the final SDU block. The padding area fills the remainder of the first PDU. The padding area is less than n bits in length and carries no layer 2 SDU data.

11 Claims, 9 Drawing Sheets

LENGTH INDICATOR FOR A PROTOCOL DATA UNIT IN A WIRELESS COMMUNICATIONS PROTOCOL

BACKGROUND OF THE INVENTION

1. Field of the Invention

The present invention relates to a wireless communications protocol. More specifically, the present invention discloses a data structure for a layer 2 protocol data unit (PDU).

2. Description of the Prior Art

The surge in public demand for wireless communication devices has placed pressure upon industry to develop increasingly sophisticated communications standards. The 3$^{rd}$ Generation Partnership Project (3GPP™) is an example of such a new communications protocol. Such standards may utilize a three-layer approach to communications. Please refer to FIG. 1. FIG. 1 is a block diagram of three layers in such a communications protocol. In a typical wireless environment, a first station 10 is in wireless communications with one or more second stations 20. An application 13 on the first station 10 composes a message 11 and has it delivered to the second station 20 by handing the message 11 to a layer 3 interface 12. Besides being used as a transmission and reception interface for the application 13, the layer 3 interface 12 may also generate layer 3 signaling messages 12a for the purpose of controlling layer 3 operations between the first station 10 and the second station 20. An example of such a layer 3 signaling message is a request for ciphering key changes, which are generated by the layer 3 interfaces 12 and 22 of both the first and the second stations, respectively. The layer 3 interface 12 delivers either the message 11 or the layer 3 signaling message 12a to a layer 2 interface 16 in the form of layer 2 service data units (SDUs) 14. The layer 2 SDUs 14 may be of any length, and have an internal format that is dictated by the layer 3 interfaces 12 and 22. The layer 2 interface 16 composes the SDUs 14 into one or more layer 2 protocol data units (PDUs) 18. Each layer 2 PDU 18 is of a fixed length, and has an internal structure that is dictated by the layer 2 interfaces 16 and 26. The layer 2 PDUs 18 are then passed on to a layer 1 interface 19. The layer 1 interface 19 is the physical layer, transmitting data to the second station 20. The transmitted data is received by the layer 1 interface 29 of the second station 20 and reconstructed into one or more PDUs 28, which are passed up to the layer 2 interface 26. The layer 2 interface 26 receives the PDUs 28 and builds up one or more layer 2 SDUs 24. The layer 2 SDUs 24 are passed up to the layer 3 interface 22. The layer 3 interface 22, in turn, converts the layer 2 SDUs 24 back into either a message 21, which should be identical to the original message 11 that was generated by the application 13 on the first station 10, or a layer 3 signaling message 22a, which should be identical to the original signaling message 12a generated by the layer 3 interface 12 and which is then processed by the layer 3 interface 22. The received message 21 is passed to an application 23 on the second station 20.

Generally speaking, each layer in the transmitting first station 10 adds information to carry the message 11 and any appended data from the upper layers. For example, the layer 3 interface 12 packs the application message 11 into one or more layer 2 SDUs 14. Each layer 2 SDU will not only include data from the message 11, but will also include internal information that is required by the layer 3 interfaces 12 and 22. The layer 2 interface 16, in a similar manner, packs the layer 2 SDUs 14 into layer 2 PDUs 18, each of which also has additional information required by the layer 2 interfaces 16 and 26. On the receiving end at the second station 20, each layer removes the added information particular to that layer, and passes the remainder up to the upper layer. Thus, the layer 2 interface 26 unpacks the layer 2 SDUs 24 from the received stream of layer 2 PDUs 28, and passes only the layer 2 SDUs 24 up to the layer 3 interface 22. Similarly, the layer 3 interface 22 unpacks the message 21 from the layer 2 SDUs 24, passing only the complete message data 21 to the application 23. As a note regarding terminology used throughout this disclosure, a PDU is a data unit that is used by a layer internally to transmit and receive information, whereas an SDU is a data unit that is passed up to, or received from, an upper layer. Thus, a layer 3 PDU is exactly the same as a layer 2 SDU. Similarly, a layer 2 PDU could also be termed a layer 1 SDU. For purposes of the following disclosure, the shortened term "SDU" is used to indicate layer 2 SDUs (that is, layer 3 PDUs), and the term "PDU" should be understood as layer 2 PDUs (i.e., layer 1 SDUs).

Of particular interest are the layer 2 interfaces 12 and 22, which act as buffers between the relatively high-end data transmission and reception requests of the applications 13 and 23, and the low-level requirements of the physical transmission and reception process at the layer 1 interfaces 19 and 29. Please refer to FIG. 2. FIG. 2 is a diagram of a transmission/reception process from a layer 2 perspective. A layer 2 interface 32 of a transmitter 30, which may be either a base station or a mobile unit, receives a string of layer 2 SDUs 34 from a layer 3 interface 33. The layer 2 SDUs 34 are sequentially ordered from 1 to 5, and are of an unequal length. The layer 2 interface 32 packs the string of layer 2 SDUs 34 into a string of layer 2 PDUs 36. The layer 2 PDUs 36 are sequentially ordered from 1 to 4, and are all of an equal length. The string of layer 2 PDUs 36 is then sent off to the layer 1 interface 31 for transmission. A reverse process occurs at the receiver end 40, which may also be either a base station or a mobile unit, with a receiver layer 2 interface 42 unpacking a received string of layer 2 PDUs 46 into a received string of layer 2 SDUs 44. Under certain transport modes, the multi-layered protocol insists that the receiver layer 2 interface 42 present the layer 2 SDUs to the layer 3 interface 43 in order. That is, the layer 2 interface 42 must present the SDUs 44 to the layer 3 interface 43 in the sequential order of the SDUs 44, beginning with SDU 1 and ending with SDU 5. The ordering of the SDUs 44 may not be scrambled, nor may a subsequent SDU be delivered to layer 3 until all of the prior SDUs have been delivered.

In line transmissions, such a requirement is relatively easy to fulfill. In the noisy environment of wireless transmissions, however, the receiver 40, be it a base station or a mobile unit, often misses data. Some layer 2 PDUs in the received string of PDUs 46 will therefore be missing. Thus, ensuring that the layer 2 SDUs 44 are presented in order can pose a significant challenge. Wireless protocols are carefully designed to address such problems. Please refer to FIG. 3 with reference to FIG. 1. FIG. 3 is a simplified block diagram of a layer 2 PDU 50, as defined in the 3GPP™ TS 25.322 specification. In general, there are two types of PDUs: a control PDU or a data PDU. Control PDUs are used by the layer 2 interfaces 16 and 26 to control data transmission and reception protocols. This is somewhat analogous to the exchange of the signaling messages 12a and 22a of the layer 3 interfaces 12 and 22. However, the layer 2 interfaces 16 and 26 do not interpret or recognize the layer 3 signaling messages 12a and 22a, whereas the layer 2 interfaces 16 and 26 do recognize layer 2 control PDUs, and do not hand layer 2 control PDUs up to the layer 3 interfaces 12 and 22. Data PDUs are used to transmit data from the upper layers, i.e., the layer 3 interfaces 12 and 22. Upon reception of data PDUs, the data contained therein is reassembled and presented to the upper layer 3 interface 12 or 22. The example PDU 50 is a data PDU, and is divided into several fields, as defined by the layer 2 protocol.

The first field 51 is a single bit indicating that the PDU 50 is either a data PDU or a control PDU. As the data/control bit 51 is set (i.e., equal to 1), the PDU 50 is marked as a data PDU. The second field 52 is a sequence number field, and is twelve bits long. Successive PDUs 18, 28 have successively higher sequence numbers, and in this way the second station 20 can properly reassembled layer 2 PDUs 28 to form layer 2 SDUs 24. That is, if a first PDU 18 is transmitted with a sequence number equal to 536, a next PDU 18 would be transmitted with a sequence number equal to 537, and so forth. As the sequence number field 52 is 12 bits in length, the sequence number field 52 can hold a maximum value of 4095. After this maximum value of 4095, the sequence numbers in the PDUs 18, 28 rollover back to zero and begin incrementing again. A single polling bit 53 follows the sequence number field 52. The polling bit 53 is set to indicate that the receiver of the PDU 50 (i.e., the second station 20) should respond with an acknowledgment status PDU, which is one kind of control PDU. Acknowledgment status PDUs are used to acknowledge a receiving status of the receiver, i.e., the second station 20, to the transmitter, i.e., the first station 10. An acknowledgment status PDU enables the first station 10 to determine which PDUs 18 have been received by the second station 20, and thus which PDUs 18 may need to be re-transmitted. The first station 10 sets the polling bit 53 to 1 to request the second station 20 to send an acknowledgment status control PDU. Following the polling bit 53 is a single bit 54a that is reserved and is set to zero. The next bit 55a is an extension bit, and when set indicates the presence of a following length indicator (LI). An LI may be either 7 bits long or 15 bits long, and is used to indicate the ending position of a layer 2 SDU within the layer 2 PDU 50. For purposes of the following invention, 15-bit LIs are considered. If a single SDU completely fills an SDU array 58 of the PDU 50, then the bit 55a would be zero, thereby indicating that no LI is present. In the example PDU 50, however, there are two layer 2 SDUs packed and ending in the layer 2 PDU 50: SDU__1 57a and SDU__2 57b. There must, therefore, be two LIs to indicate the respective ends of the SDU__57a and the SDU₂ 57b. A PDU following the PDU 50 would hold the LI for SDU₃ 57c. The first LI is in field 56a following the extension bit field 55a, and marks the ending position 58a of the SDU₁ 57a. For this example, if we assume that SDU__1 has a size of 30 octets (30 bytes), then the first LI 56a would hold a binary value of 30 (000000000011110), as is shown in FIG. 3, indicating that the end 58a of SDU₁ 57a is 30 octets into the SDU array 58. The first LI 56a has an extension bit 55b that is set, indicating the presence of another LI, a second LI in field 56b. The second LI 56b indicates the ending position 58b of the SDU__57b, and has an extension bit 55c that is cleared, signifying that there are no more LIs, and that the SDU array 58 is thus beginning. If we assume that SDU__2 57b has a size of 35 octets, then the ending position 58b of SDU__2 57b is 65 octets (30+35) into the SDU array 58. Hence, the second LI 56b holds a binary value of 65 (000000001000001).

The PDU 50 may be loosely broken into three regions: a sequence number region 54 that holds the sequence number field 52, and the bits 51, 53 54a and 55a; a length indicator array 59 that holds the LIs 56a and 56b, and an SDU array 58 that is used to hold SDU data blocks 57a, 57b and 57c. Each SDU data block 57a, 57b and 57c holds data for respective layer 2 SDUs. Depending on the size of the layer 2 SDUs, certain special cases may arise when packing the SDUs into the PDUs 50. These special cases are signaled by the use of special-valued LIs in the length indicator array 59, and are partly considered in the table below:

TABLE 1

| Bit | Description |
| --- | --- |
| 000000000000000 | The previous PDU was exactly filled with the last segment of an SDU, and there is no LI in the previous PDU that indicates the end of the SDU. |
| 111111111111011 | The last segment of an SDU was one octet short of exactly filling the previous PDU and there is no LI in the previous PDU that indicates the end of the SDU. |
| 111111111111111 | The rest of the PDU is padding. |

To understand the entries in Table 1 above, two example situations are considered below. In the following, PDUs are assumed to have a total size of 130 octets. An octet is eight bits. The sequence number region 54 thus has a total size of two octets, leaving a maximum size of 128 octets for the SDU array 58.

Situation 1

Please refer to FIG. 4. FIG. 4 is a block diagram illustrating a first packing condition of SDUs into PDUs. A first SDU, SDU__4, has a size of 128 octets. It is to be followed by a second SDU, SDU__5 with a size of 123 octets, followed by a third SDU, SDU__6 of 100 octets. To perform this packing operation, three SDUs, 60, 70 and 80, are used. The first SDU 60 holds a sequence number 61a of zero in the sequence number region 61. The extension bit 61b is cleared, indicating that there is no length indicator array, and that the SDU array 63 begins immediately and is completely filled with data from a single SDU, the SDU__4 63a. The data from SDU__4 63a exactly fills the SDU array 63. It is thus not possible to have any LI to mark the terminating end of SDU__4 63a, as such an LI would require two octets, which would push the terminating end of SDU__4 63a into the second PDU 70. The end of SDU__4 63a is therefore indicated by a special LI in the second SDU 70. The second SDU 70 has a sequence number 71a of one, indicating that the second PDU 70 is immediately sequentially after the first PDU 60. The extension bit 71b is set, indicating the presence of a length indicator array 72. The first LI 72a in the length indicator array 72 is all zeros. This is a special LI, and indicates that the previous PDU 60 was exactly filled by the SDU__4 63a. The next LI 72b indicates that the end of SDU__5 73a is found 123 octets into the SDU array 73. SDU__5 73a does not completely fill the second PDU 70, leaving a single octet of space available. This single octet of free space is used to pack the first portion 73b of SDU__6. SDU__6 thus spans from the second PDU 70 to the third PDU 80. There is no LI for SDU__6 in the second PDU 70 as the data for SDU__6 does not terminate within the second PDU 70. The final LI 72b in the length indicator array 72 thus does not mark the end of the final SDU data block 73b, but instead marks the end of the second-to-last SDU data block 73a. The LI for SDU__6 is found in the third PDU 80. The third PDU 80 has a sequence number 81a of two in the sequence number region 81, indicating that the third PDU 80 follows the second PDU 70, and has the extension bit 81b set to indicate that a length indicator array 82 is present. The first entry 82a in the length indicator array 82 marks the terminating end of SDU_6, which is 99 octets into the SDU array 83. Note that SDU_6 is 100 octets in length, but the first octet is held in the second PDU 70, and thus the LI 82a holds a value of 99. The second LI 82b in the length indicator array 82 is a series of ones. This is a special LI, and indicates that all data after the SDU array 83 is simply a padding area PAD_1 84. The padding area PAD_1 84 is 25 octets in length. The PAD_1 area 84 holds no layer 2 SDU data, and is simply required to fill out the PDU 80 to a length of 130 octets in size. In certain embodiments, the PAD_1 area 84 may be used to hold layer 2 PDU signaling data, if sufficient in size, but the PAD_1 area 84 never holds any layer 2 SDU data. The final LI 82b in the length indicator array 82 does not indicate the ending position of the final SDU data block 83a in the SDU array 83. Instead, the final LI 82b signals that the previous LI 82a marks the end of the SDU array 83, and hence the beginning of the padding area PAD_1 84.

Situation 2

Please refer to FIG. 5 with reference to FIG. 4. FIG. 5 is a block diagram illustrating a second packing condition of SDUs into PDUs. A first SDU, SDU_7, has a size of 127 octets. SDU_7 is to be followed by a second SDU, SDU_8 with a size of 123 octets, followed by a third SDU, SDU_9 of 100 octets. To perform this packing operation, three SDUs, 90, 100 and 110, are used. This scenario is almost identical to that depicted and explained in FIG. 4, except that the first SDU, SDU_7, is one octet short of exactly filling the SDU array 93 of the first PDU 90. As it is again not possible to place an LI marking the end of SDU_7 93a into PDU 90, a special LI 102a is used as the first LI in a length array 102 of the second PDU 100. The special LI 102a indicates that SDU_7a is one octet short of filling the SDU array 93. The last octet PAD_2 94 in the PDU 90 is thus discarded. The rest of PDU 100, and all of PDU 110, are as described for the PDUs 70 and 80, respectively.

Within the PDUs 60 and 90 themselves, no LIs are available to mark the ending position of the SDU data blocks SDU_4 63a and SDU_7 93a, respectively. Consequently, the special LIs 72a and 102a are used in the subsequent PDUs 70 and 100 to indicate the respective ending positions of SDU_4 63a and SDU_7 93a. However, the SDU data blocks SDU_5 73a and SDU_8 103a are marked within their respective PDUs 70 and 100 by the LIs 72b and 102b. It is thus possible to immediately follow the SDU data blocks SDU_5 73a and SDU_8 103a with succeeding SDU data of SDU_6 73b and SDU_9 103b. Although this is beneficial from a packing standpoint, it is not always beneficial from a transmitting standpoint. Consider, for example, the situation in which data from SDU_8 103a is ready to be transmitted, but the data from SDU_9 103b is not yet ready. An additional LI marking the rest of the PDU 100 after SDU_8 103a as padding (i.e., a length indicator of 1111111111111111) is not possible as such an LI requires two octets of space, and only a single octet is available in region 103b. The layer 3 data in SDU_8 103a thus must wait until the data for SDU_9 103b becomes available, as PDU 100 cannot be sent out until it reaches its full compliment of 130 octets. Such a delay will adversely affect the overall transmission characteristics of the transmission protocol.

SUMMARY OF THE INVENTION

It is therefore a primary objective of this invention to provide a PDU data structure that resolves the above-mentioned problem.

Briefly summarized, the preferred embodiment of the present invention discloses a data structure for a first layer 2 protocol data unit (PDU) to carry layer 2 service data unit (SDU) data in a wireless communications system. The data structure has a sequence number region that holds a sequence number for indicating a sequential ordering of the first PDU in a stream of PDUs. A length indicator array follows the sequence number field, and has at least a final length indicator. The final length indicator is the last length indicator in the length indicator array and is n bits in length. An SDU array follows the length indicator array. The SDU array has at least a final SDU data block. The final SDU block is the last SDU in the SDU array. The final length indicator indicates a position of the end of the final SDU block within the first PDU. Finally, a padding area is after the final SDU block. The padding area fills the remainder of the first PDU. The padding area is less than n bits in length and carries no layer 2 SDU data.

It is an advantage of the present invention that the existence of the padding area prevents SDU data the necessity of waiting on subsequent SDU data to effect packing. SDU data may thus be transmitted as it is requested by the upper layer, improving the overall transmission efficiency of the communication protocol.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

In the following description, a communications protocol as disclosed in the 3GPP™ specification TS 25.322, V3.5.0, is used by way of example. However, it should be clear to one in the art that any wireless communications protocol that must pack layer 3 data into layer 2 protocol data units (PDUs) may benefit from the disclosure contained herein. It should be further noted that transmitters and receivers in the following detailed description can include cellular telephones, personal data assistants (PDAs), personal computers (PCs), or any other devices that utilize a 3-layered wireless communications protocol.

Figure 1:
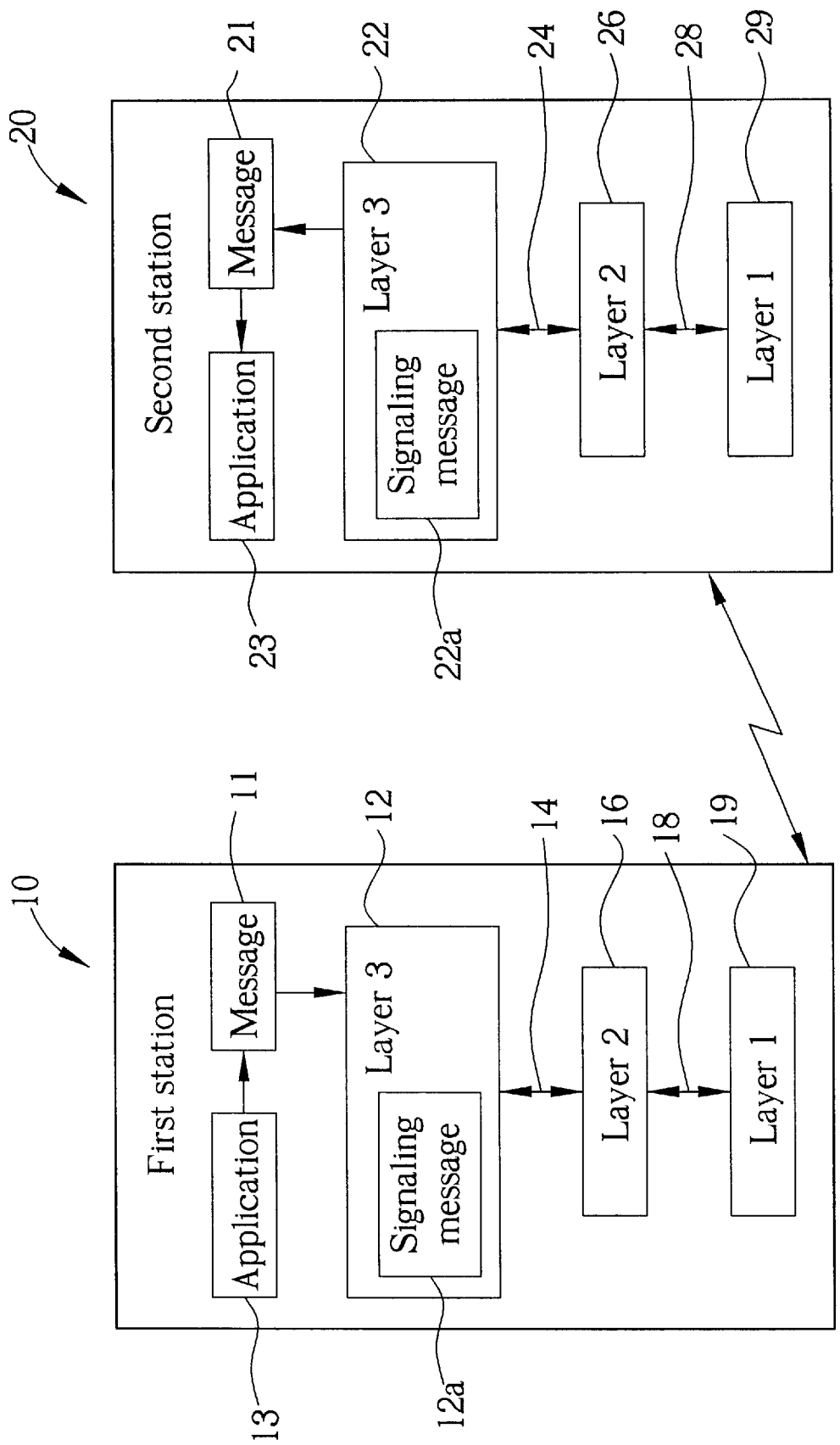
FIG. 1 is a block diagram of a prior art three-layer communications protocol.
Figure 2:
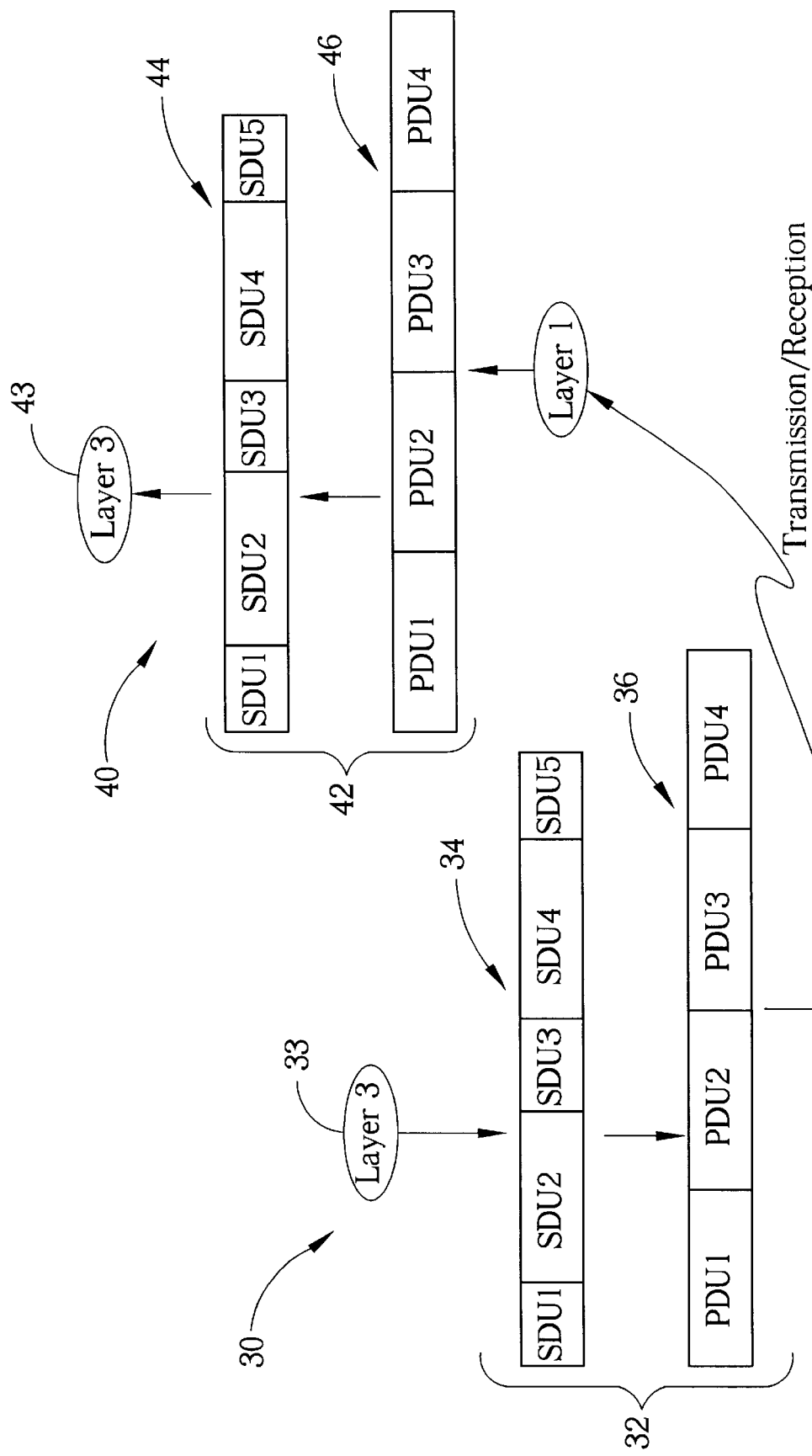
FIG. 2 is a simplified diagram of a prior art transmission/reception process from a layer 2 perspective.
Figure 3:
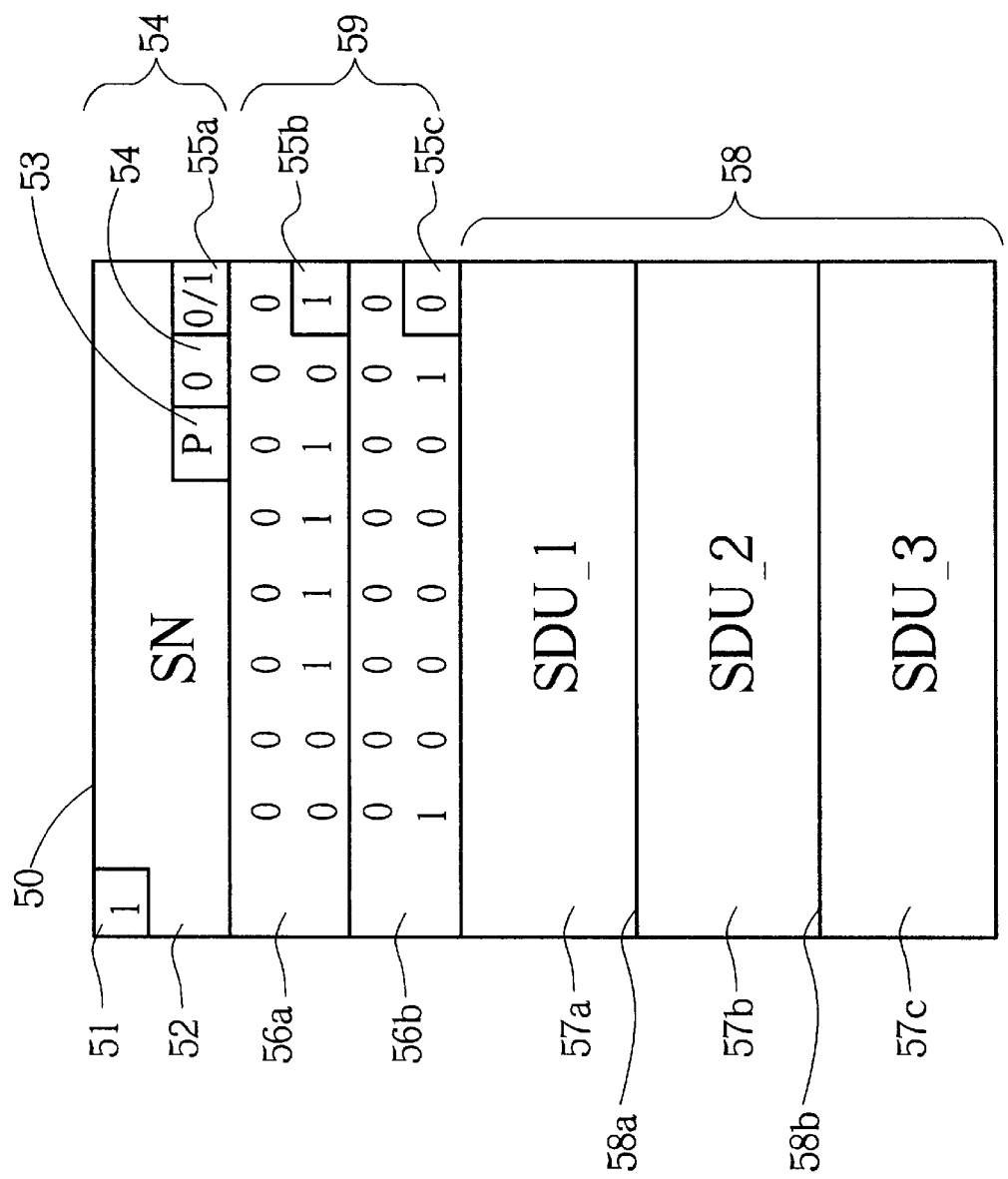
FIG. 3 is a simplified block diagram of a prior art layer 2 protocol data unit (PDU).
Figure 4:
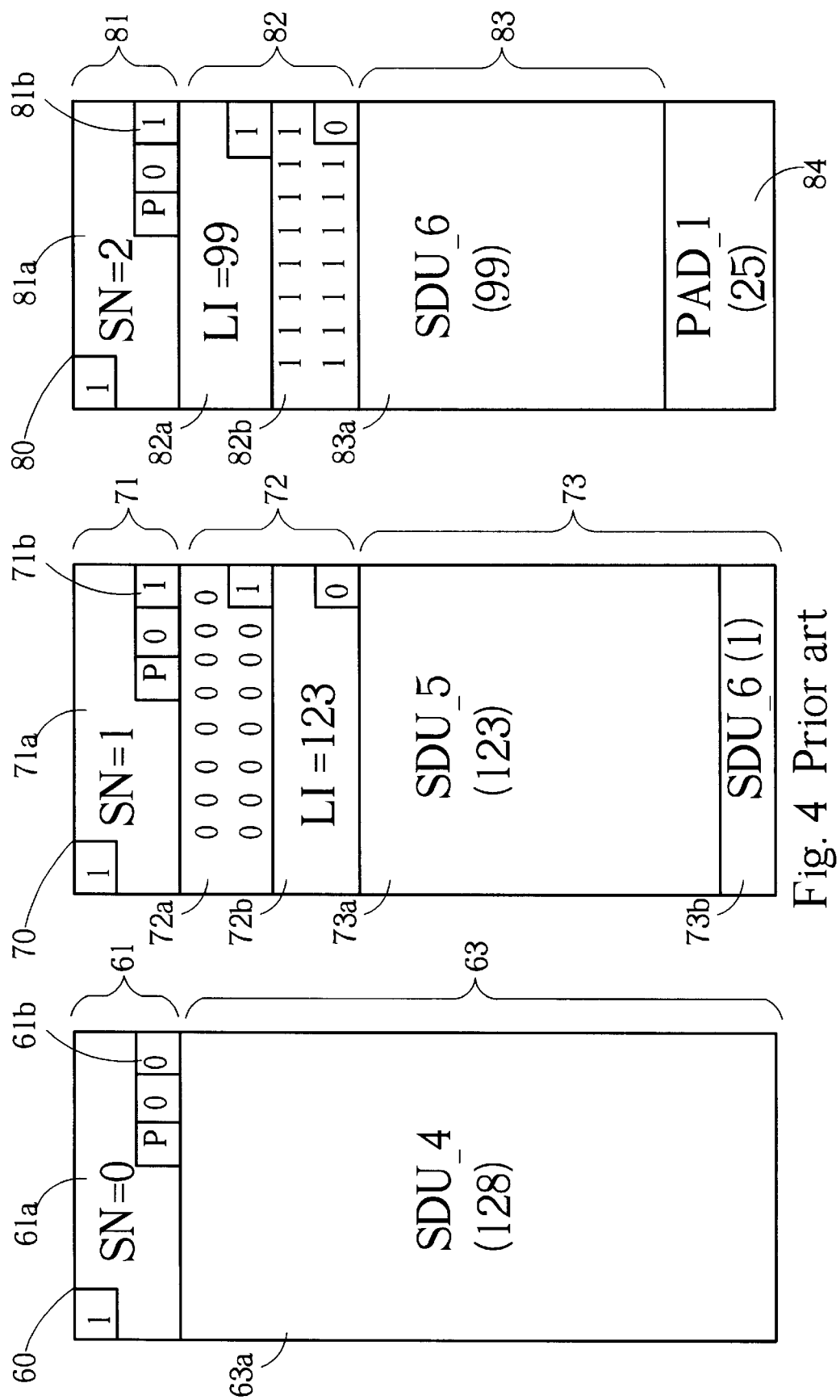
FIG. 4 is a block diagram illustrating a first packing condition of service data units (SDUs) into PDUs according to the prior art.
Figure 5:
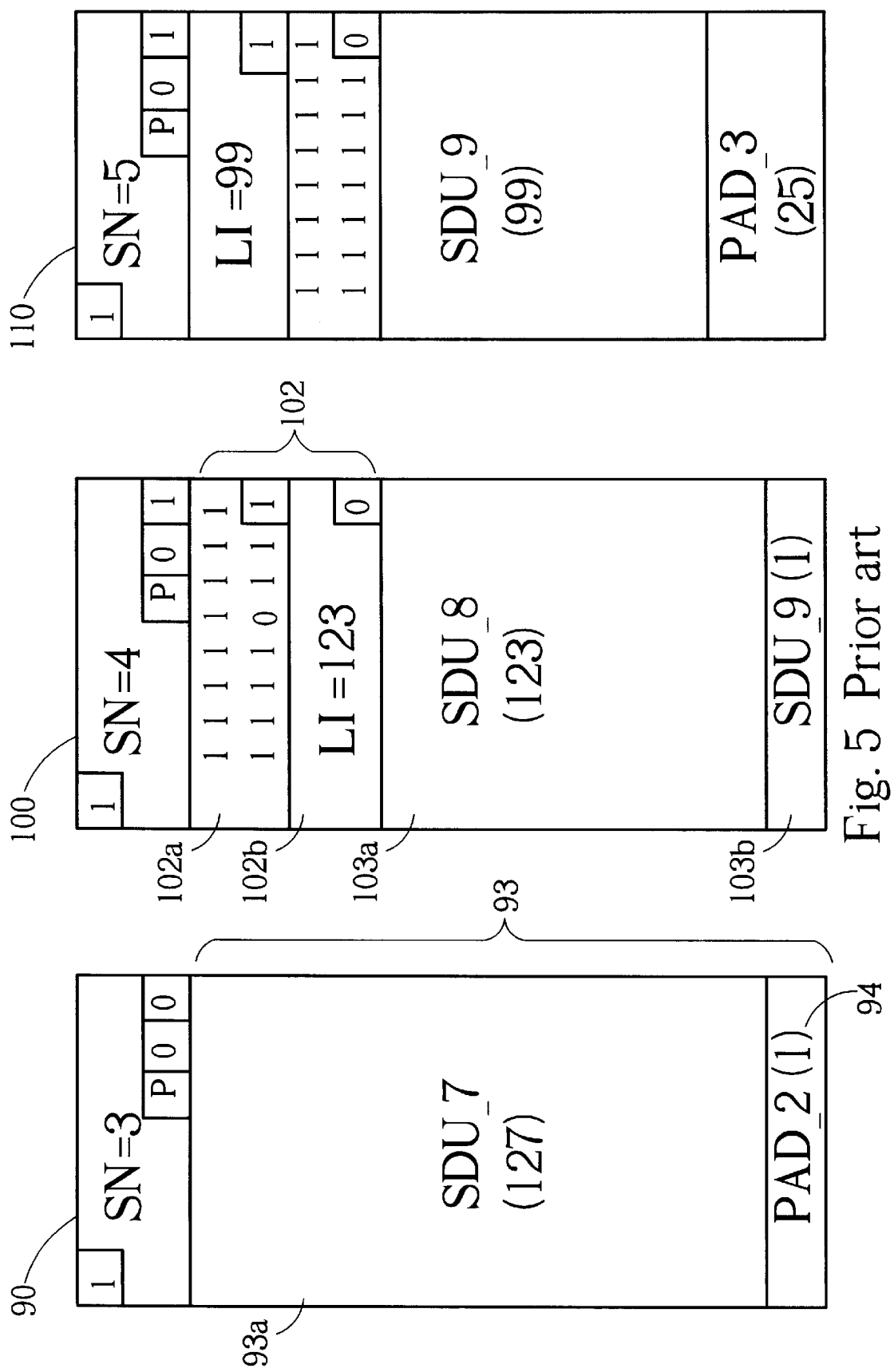
FIG. 5 is a block diagram illustrating a second packing condition of SDUs into PDUs according to the prior art. the present invention.
Figure 6:
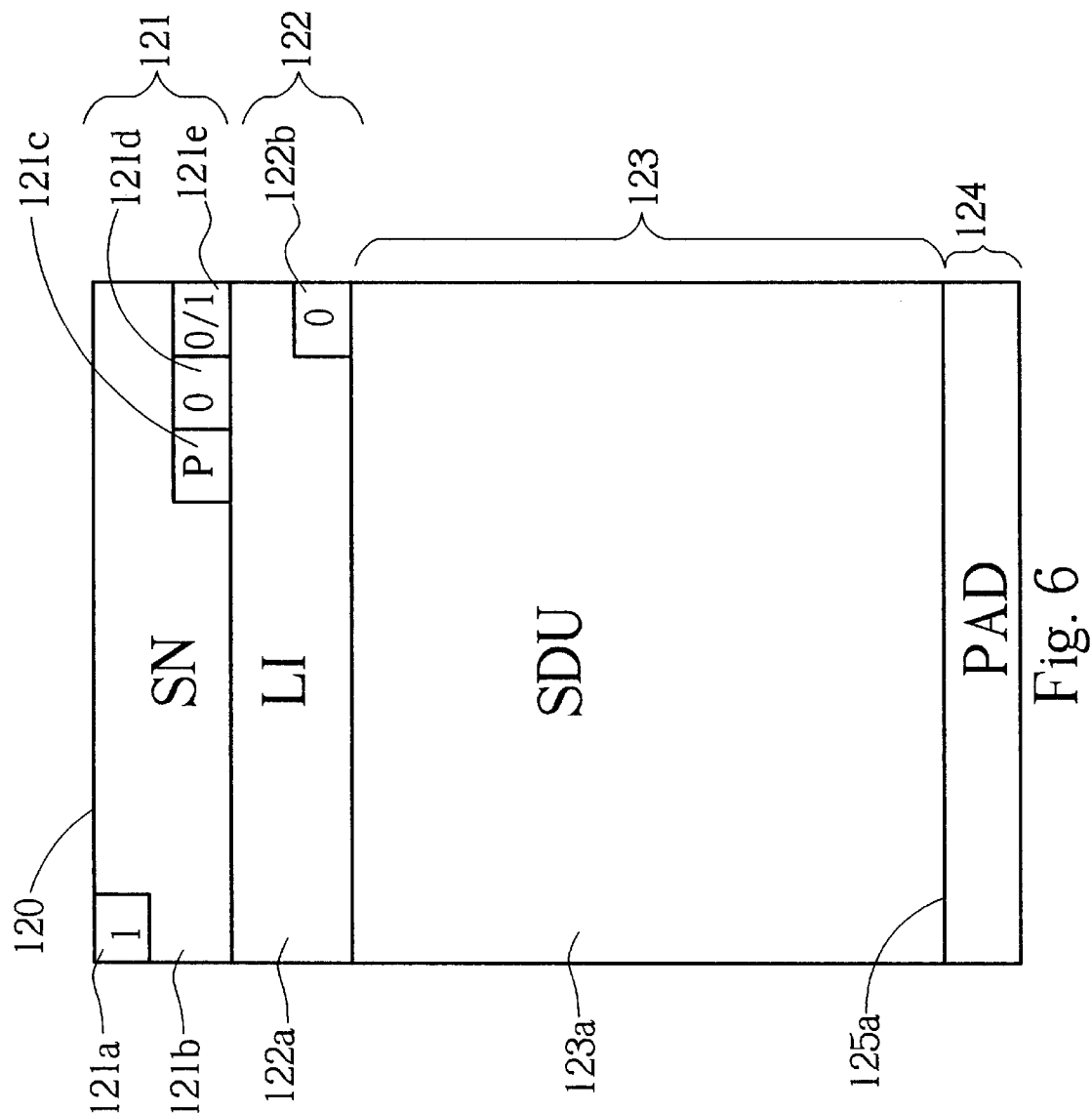
FIG. 6 is a simplified block diagram of the data structure of a PDU according to the present invention.

The present invention provides a data structure for a layer 2 PDU. The PDU is used to carry layer 2 service data unit (SDU) data. The layer 2 SDU data originates from a layer 3 interface, or, ultimately, from an application program. The data structure of the present invention is utilized by both transmitters and receivers in a wireless communications system that uses the wireless communications protocol. Please refer to FIG. 6. FIG. 6 is a simplified block diagram of the data structure of an example PDU 120 according to the present invention. The PDU data structure 120 includes a sequence number region 121, a length indicator array 122, an SDU array 123 and a padding area 124. The sequence number region 121 includes a single data/control bit 121a, which indicates if the PDU 120 is a data or a layer 2 control PDU. In the preferred embodiment, the data/control bit 121a is set (i.e., is equal to one), and thus the PDU 120 is a data PDU. Immediately after the data/control bit 121a is a 12-bit sequence number 121b. The sequence number 121b holds a value that indicates the relative sequential ordering of the PDU 120 within a stream of transmitted or received PDUs. Immediately after the sequence number 121b is a polling bit 121c, a reserved bit 121d and an extension bit 121e. The polling bit 121c is set to indicate a polling request function of a receiver from a transmitter, as disclosed in the Description of the Prior Art. The reserved bit 121d is set to zero. The extension bit 1221e is always set to one for the data structure of the present invention, to indicate the presence of the subsequently following length indicator array 122.

The length indicator array is used to hold an array of at least one length indicator (LI) 122a. The LI 122a is 2m−1 bits in length. In the preferred embodiment, m is 8 so that the LI 122a is 15 bits in length. Immediately after the LI 122a is an extension bit 122b. The extension bit 122b fills out the $2m^{th}$ bit, i.e., the $16^{th}$ bit, so that the length indicator array 122 is always a multiple of 2m bits in size. When set, the extension bit 122b indicates the presence of another LI after the extension bit 122b. LI 122a is the final LI in the length indicator array, and so the extension bit 122b is cleared, indicating that the SDU array 123 immediately follows. It should be noted that the data structure of the present invention allows for a plurality of LIs in the length indicator array 122, each LI having a corresponding extension bit, and each LI being 2m−1 bits in length (each extension bit being used to fill out the $2m^{th}$ bit). The PDU 120 is shown with only the single LI 122a for the sake of simplicity. Nevertheless, in the data structure of the present invention, there will always be a final LI in the length indicator array 122. This final LI will be the last LI in the length indicator array 122, and thus will always have a corresponding extension bit set to zero. For purposes of the following, the LI 122a is considered to be the final LI, and hence its corresponding extension bit 122b is cleared.

The SDU array 123 immediately follows the cleared extension bit 122b of the final LI 122a, and holds at least one SDU data block 123a. The final LI 122a points to the end 125a of a final SDU data block 123a in the SDU array 123, and thus marks the end of the SDU array 123. The number of SDU data blocks within the SDU array 123 will have a one-to-one correspondence with LIs in the length indicator array 122. A possible exception to this rule is a first LI in the length indicator array 122 which may be a special LI as disclosed in the Description of the Prior Art. Such a special LI is used to indicate a terminating position of an SDU data block within a sequentially prior PDU. All subsequent LIs after the special LI, though, would have a one-to-one correspondence with SDU data blocks in the SDU array 123. Consequently, as there is always a final LI 122a in the length indicator array 122, there must also be a corresponding final SDU data block 123a in the SDU array 123. Again, for purposes of the following simplified PDU 120, the SDU data block 123a is considered the final SDU data block. The SDU array 123 is used to hold layer 2 SDU data received from a layer 3 interface. The SDU array 123 does not hold any layer 2 or layer 1 data.

A padding area 124 fills the remainder of the PDU 120 from the end 125a of the SDU array 123 (which marks the end of the final SDU data block 123a), and is less than 2m−1 bits in size. In the preferred embodiment, the padding area 124 is always an octet, i.e., the padding area 124 is always 8 bits in size. The padding area 124 contains no layer 2 SDU data.

The data structure of the present invention is utilized when a final SDU data block, such as the SDU data block 123a, is found to be one octet short of completely filling the remainder of a PDU, as is the case of the PDU 120. Rather than insisting that the remaining area, which corresponds to the padding area 124, be filled with layer 2 SDU data, it is instead assumed that the remaining area be padding, i.e., the padding area 124. In this manner, the final SDU data block 123a need not wait upon possibly unavailable subsequent SDU data prior to transmission. The transmitter can instead immediately pack the padding area 124 after the final SDU data block 123a and send the PDU 120. On a receiving side, when it is noted that the final LI 122a indicates the end 125a of the final SDU data block 123a that is one octet short of filling the PDU 120, the padding area 124 is intrinsically assumed. The receiver thus assumes that no layer 2 SDU data is contained within the padding area 124.

Figure 7:
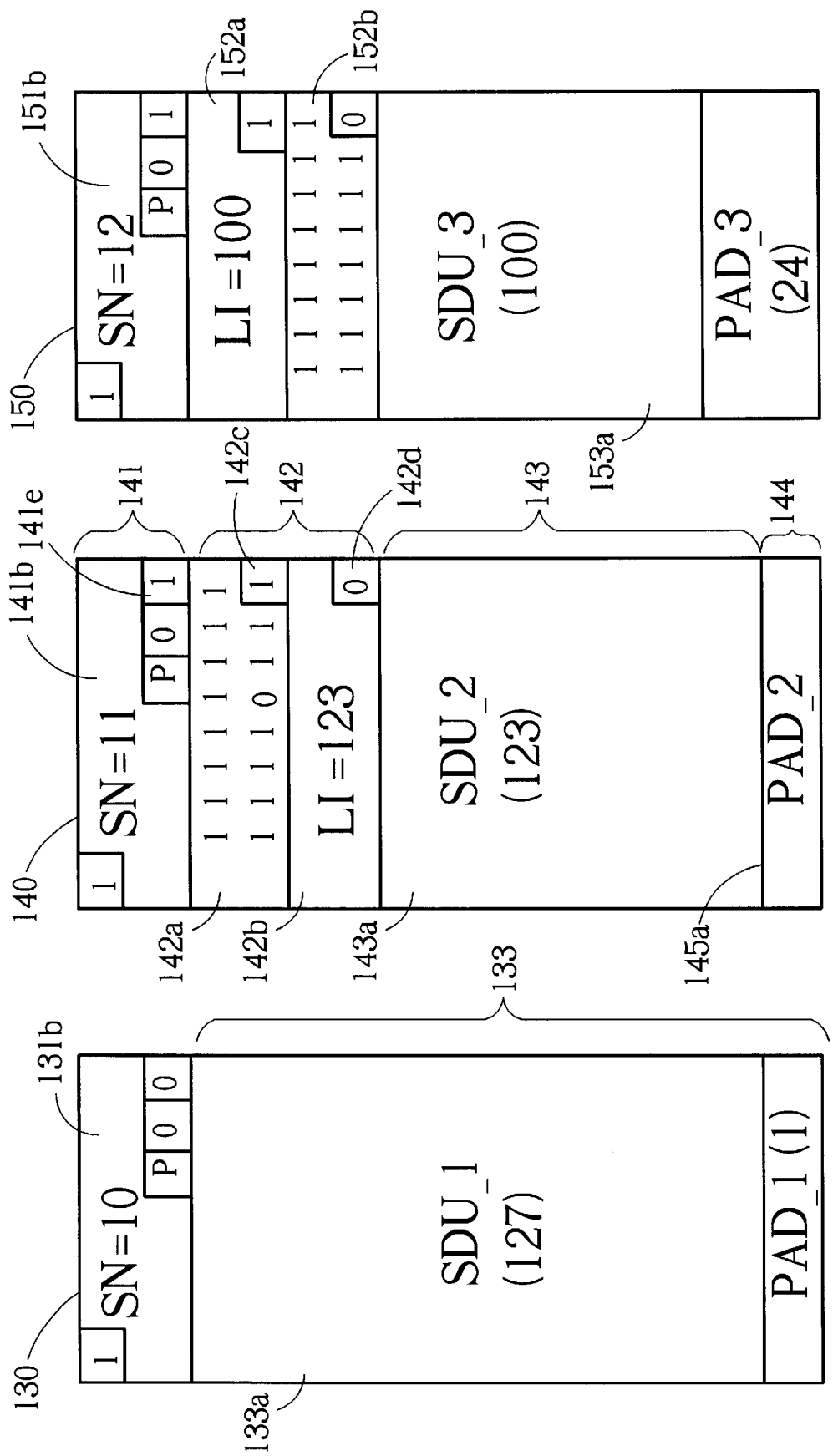
FIG. 7 illustrates packing of SDU data within PDUs, utilizing the data structure of the present invention.

To better illustrate the above, consider the following specific example: a first SDU, SDU_1, of 127 octets in size, is to be transmitted. Immediately following SDU_1 is a second SDU, SDU_2, of 123 octets in size, and a third SDU, SDU_3, that is 100 octets in size. Further assume that each PDU has a fixed size of 130 octets. Please refer to FIG. 7. FIG. 7 illustrates this packing of SDU data within PDUs, utilizing the data structure of the present invention. To effect packing of the SDU data into PDUs, three PDUs are used: a first PDU 130, a second PDU 140 and a third PDU 150. Of particular interest is the second PDU 140, which utilizes the data structure of the present invention. The PDU 140 has a sequence number region 141, a length indicator array 142, an SDU array 143 and a padding area 144. A 12-bit sequence number 141b in the sequence number region 141 has a value of 11, which indicates that the PDU 140 is sequentially after the PDU 130 (which has a sequence number 131b of 10), and is sequentially before the PDU 150 (which has a sequence number 151b of 12). An extension bit 141e is set, indicating the presence of the length indicator array 142. The length indicator array 142 has two LIs: a first LI 142a and a final LI 142b. The first LI 142a holds a special value of 32,763 (111111111111011 binary), indicating that SDU_1 133a in PDU 130 ended one octet short of filling the SDU array 133, and that there is NO LI in the PDU 130 to indicate the end of SDU_1 133a. The final LI 142b in the PDU 140 holds a value of 123, and marks the end 145a of SDU_2 143a in the SDU array 143. An extension bit 142d immediately follows the final LI 142b and is cleared (i.e., set to zero) to indicate that the length indicator array 142 is terminated and that the SDU array 143 is beginning. The SDU array 143, for this particular example, holds only one SDU data block, SDU_2 143a. SDU_2 143a is thus the final SDU data block in the SDU array 143, and the final LI 142b indicates the end 145a of the final SDU data block SDU_2 143a. The end 145a is at octet 129, that is, exactly one octet short of the end of the PDU 140. The remainder of the PDU 140 is thus filled by a padding area PAD_2 144, which holds no SDU data. The padding area PAD_2 144 is less than the size of an LI in the length indicator array 142, being 8 bits in size (m) versus the 15 bits (2m−1) of the final LI 142b. The third PDU 150 has two LIs: a first LI 152a that marks the end of SDU_3 153a, and a second LI 152b that is a special LI indicating that the rest of the PDU 150 after SDU_3 153a is padding. Hence, the rest of the PDU 150 is filled by PAD_3. Because no data from SDU_3 153a is tangled up in the PDU 140, it is possible to immediately transmit PDU 140 even before the data for SDU_3 153a is available. Also, as the padding area PAD_2 144 is assumed (because the last LI 142b points to an octet before the end of the PDU 140), no special LI is required in PDU 150 to mark the presence of PAD_2 144.

Figure 8:
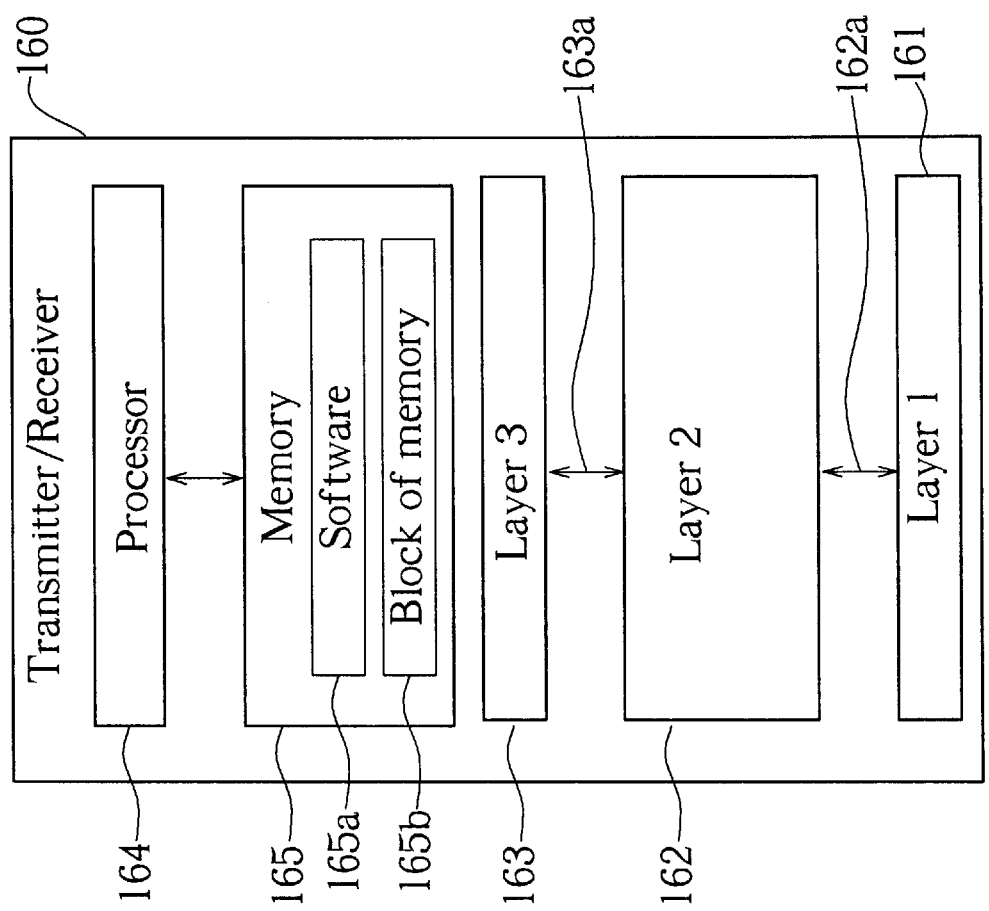
FIG. 8 is a simplified block diagram of a station that utilizes the data structure of the present invention.
Figure 9:
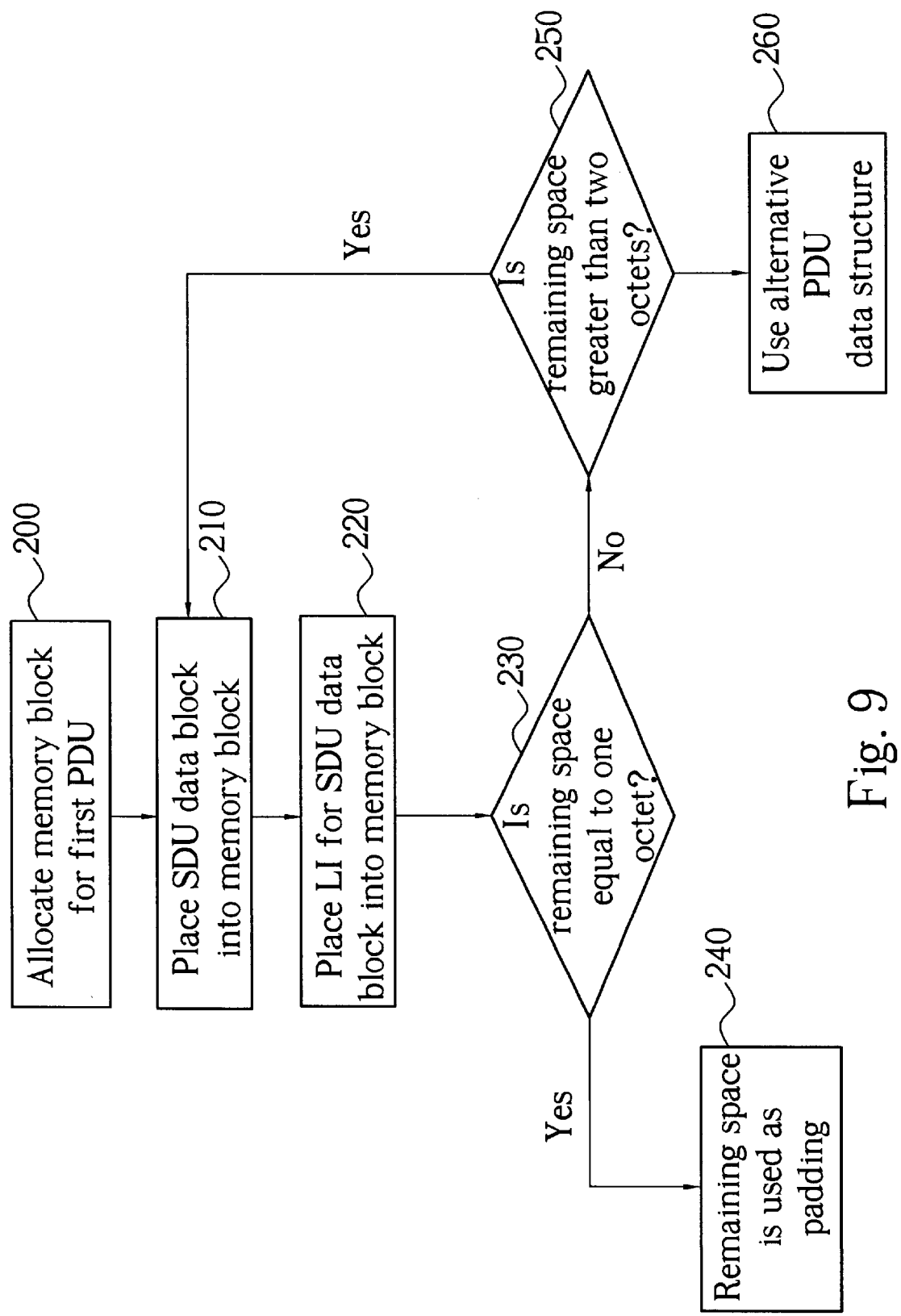
FIG. 9 is a flowchart for a method to generate the data structure of the present invention.

Please refer to FIG. 8. FIG. 8 is a simplified block diagram of a station 160 that utilizes the data structure of the present invention. The station 160 may be either a transmitter or a receiver, and utilizes a wireless communications protocol that has a layer 3 interface 163, a layer 2 interface 162 and a layer 1 interface 161. A processor 164 and memory 165 are used to implement the layers 163, 162 and 161. The memory includes software 165a that is executed by the processor 164 to implement the interfaces 163, 162 and 161. The layer 3 interface 163 exchanges data with the layer 2 interface 162 via layer 2 SDUs 163a. The layer 2 interface 162, in turn, exchanges data with the layer 1 interface 161 by way of layer 2 PDUs 162a. In particular, the software 165a will contain code to generate the data structure of the present invention. Please refer to FIG. 9 in conjunction with FIG. 8 and FIG. 6. FIG. 9 is a flowchart for a method to generate the data structure of the present invention. The software 165a utilizes the method as shown in the flowchart of FIG. 9 to generate the data structure of the present invention. The method comprises the following steps:

200: Allocate a block of memory 165b that is sufficiently large to accommodate the size of the PDU 120. For example, in keeping with the previous examples, the block of memory 165b should be 130 bytes in size to accommodate the PDU 120 that is 130 octets in length. The block of memory 165b is partitioned into the three regions along the line of PDU 120, i.e., a sequence number region 121, a length indicator array 122 and an SDU array 123. The fields in the sequence number region 121 are filled in appropriately. An initial special LI may need to be placed into the length indicator array 122 depending on the data structure used in a sequentially prior PDU.

210: Obtain layer 2 SDU data 163a from the layer 3 interface 163 and place it into the SDU array 123 as an SDU data block 123a. The SDU data block 123a must not be so large that it extends beyond the block of memory 165b.

220: For the SDU data block 123a placed into the SDU array region 123 from step 210, place an LI 122a into the length indicator array 122. The LI 122a should indicate the end 125a of the SDU data block 123a in the SDU array 123. Depending on the method used, this may require shifting SDU data blocks down in the SDU array 123, and if this is so, then the LIs in the length indicator array 122 will need to be updated accordingly. Also, the extension bit of an LI immediately before the newly inserted LI must be set if it exists.

230: Check the space remaining in the SDU array 123. The space remaining is calculated from the end 125a of the SDU data block 123a placed into the SDU array 123 in step 210 to the end of the block of memory 165b. If the remaining space is equal to one octet (i.e., one byte, which is less than the 15 bits of an LI), then proceed to step 240. Otherwise, proceed to step 250.

240: The remaining space (one octet) is used as padding 124. The padding may be filled with a default value (such as zero), ignored (using the value already found in the block of memory 165b), or filled with useful layer 2 data. The extension bit 122b of the final LI 122a should be cleared. The PDU 120 having the data structure according to the present invention is completed, formed in the block of memory 165b, and is ready to be transmitted.

250: If the remaining space calculated from step 230 exceeds the size of an LI, then more layer 2 SDU data can be packed into the SDU array 123 of the block of memory 165b, and so loop back to step 210 to obtain more layer 2 SDU data. Otherwise, the remaining space is equal to the size of an LI or is zero, and an alternative PDU data structure will need to be used.

In contrast to the prior art, the present invention provides a PDU data structure with an intrinsic padding region when only a single octet of remaining space is available to in the PDU. This padding region enables the PDU to be immediately transmitted without the necessity of waiting upon additional layer 2 SDU data. As the PDU data structure has a distinctive characteristic of the final LI pointing to one octet before the end of the PDU, a receiver can automatically assume the presence of the padding region, and thus no addition LI in a subsequent PDU is required to unpack the layer 2 SDU data contained in the present invention PDU data structure. Overall transmission speeds are thereby improved by the use of the present invention PDU data structure.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A data structure for a first layer 2 protocol data unit (PDU) to carry layer 2 service data unit (SDU) data in a wireless communications system, the data structure comprising:
   a sequence number region that holds a sequence number for indicating a sequential ordering of the first PDU in a stream of PDUs;
   a length indicator array after the sequence number region that holds length indicators indicating the ending positions of SDUs carried by the first PDU, the length indicator array having at least a final length indicator, the final length indicator being the last length indicator in the length indicator array and being n bits in length;
   an SDU array having at least a final SDU data block, the final SDU data block being the last segment of the last SDU in the SDU array; and
   a padding area of at least 1 bit in length after the final SDU data block that fills the remainder of the first PDU;
   wherein the padding area is less than n bits in length, and no special explicit length indicator is contained in the length indicator array to indicate the presence of the padding area, the length indicator indicating that the ending position of the final SDU data block is the final length indicator in the length indicator array.

2. The data structure of claim 1 wherein each length indicator is n bits in length.

3. The data structure of claim 1 wherein each length indicator is 2m−1 bits in length and the padding area is m bits in length.

4. The data structure of claim 1 wherein no special length indicator is required in a second PDU to indicate the presence of the padding area, the second PDU being sequentially immediately after the first PDU in the stream of PDUs.

5. A method for generating a layer 2 protocol data unit (PDU) to carry layer 2 service data unit (SDU) data in a wireless communications protocol, the method comprising:

providing a memory block for a first PDU;

placing at least an ending segment from a final SDU into a data region of the memory block, wherein the final SDU is the last SDU carried by the first PDU;

placing at least a final length indicator of n bits in length into a length indicator region of the memory block, wherein the final length indicator is the last length indicator in the length indicator region and is n bits in length;

determining a remaining space at least 1 bit in length within the memory block, the remaining space being memory unoccupied; and providing a padding area that spans the remaining space, wherein the padding area contains no SDU data;

wherein the padding area is less than n bits in length, no special explicit length indicator is contained in the length indicator region to indicate the presence of the padding area, and the length indicator indicating the ending position of the final SDU data block is the final length indicator.

6. The method of claim 5 wherein the length indicator region is before the data region, and the padding area is after the data region to terminate the first PDU.

7. The method of claim 5 further comprising providing a sequence number region in the memory block to hold a sequence number that indicates a sequential ordering of the first PDU in a stream of PDUs.

8. The method of claim 7 wherein the sequence number region is before the length indicator region.

9. A The method of claim 7 wherein no special length indicator is required in a second PDU to indicate the presence of the padding area, the second PDU being sequentially immediately after the first PDU in the stream of PDUs.

10. The method of claim 5 wherein the first length indicator is 2m−1 bits in length and the padding area is m bits in length.

11. The method of claim 10 wherein m is 8.

* * * * *